(12) United States Patent
Melancon, Jr.

(10) Patent No.: US 9,067,524 B2
(45) Date of Patent: Jun. 30, 2015

(54) CONTAINER HAVING A DOWNWARDLY PIVOTABLE RAMP WALL, AND METHOD

(76) Inventor: Dennis W. Melancon, Jr., Lynchburg, VA (US)

( * ) Notice: Subject to any disclaimer, the term of this patent is extended or adjusted under 35 U.S.C. 154(b) by 906 days.

(21) Appl. No.: 13/278,376

(22) Filed: Oct. 21, 2011

(65) Prior Publication Data

US 2013/0101374 A1  Apr. 25, 2013

(51) Int. Cl.
*B65F 3/26* (2006.01)
*B60P 1/28* (2006.01)
*B60P 1/64* (2006.01)

(52) U.S. Cl.
CPC ............... *B60P 1/286* (2013.01); *B60P 1/6463* (2013.01)

(58) Field of Classification Search
CPC ........................................................ B60P 1/04
USPC .................................. 414/491, 494, 498, 500
See application file for complete search history.

(56) References Cited

U.S. PATENT DOCUMENTS

| | | | |
|---|---|---|---|
| 3,809,278 A | 5/1974 | Csumrik | |
| 5,125,713 A | 6/1992 | Willingham | |
| 5,192,176 A | 3/1993 | Roberts | |
| 5,743,701 A * | 4/1998 | Green | 414/498 |
| 6,910,574 B2 | 6/2005 | Straka | |
| 7,484,789 B1 | 2/2009 | Aulick | |
| 7,717,290 B2 * | 5/2010 | Gerding | 220/629 |
| 7,819,270 B1 | 10/2010 | Hughes | |
| 8,043,043 B2 * | 10/2011 | Collins | 414/812 |

* cited by examiner

*Primary Examiner* — Saul Rodriguez
*Assistant Examiner* — Willie Berry, Jr.
(74) *Attorney, Agent, or Firm* — Lawrence E. Laubscher, Sr.; Lawrence E. Laubscher, Jr.; Robert D. Spendlove

(57) ABSTRACT

A storage bin for bulk landscaping material includes a bin body having a bottom wall, a pair of parallel spaced side walls, and a rear end wall closing the rear end of the bin body, thereby to define a chamber that is open at its front end. A rectangular ramp wall is hingedly connected with the bottom wall at the front end of the bin body for displacement between a vertical position partially closing the chamber front end, and a downwardly inclined ramp position in engagement with the ground, whereby an unloading vehicle may be driven up the ramp to engage the bulk material. At least one first horizontal connecting bar is mounted at the forward end of the storage bin, whereby the bin may be transported to a site by a tilt flat bed transporting vehicle, and deposited in a controlled manner rear-end-first from the flat bed.

5 Claims, 4 Drawing Sheets

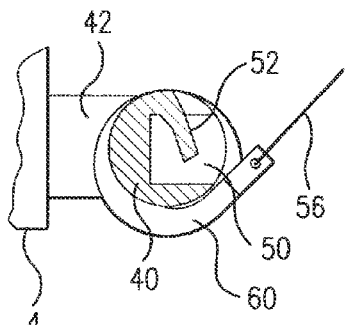
FIG. 9
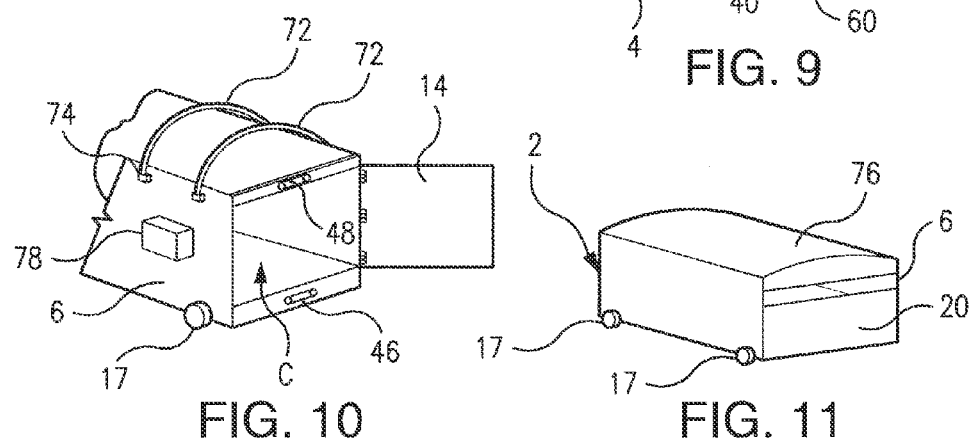
FIG. 10
FIG. 11
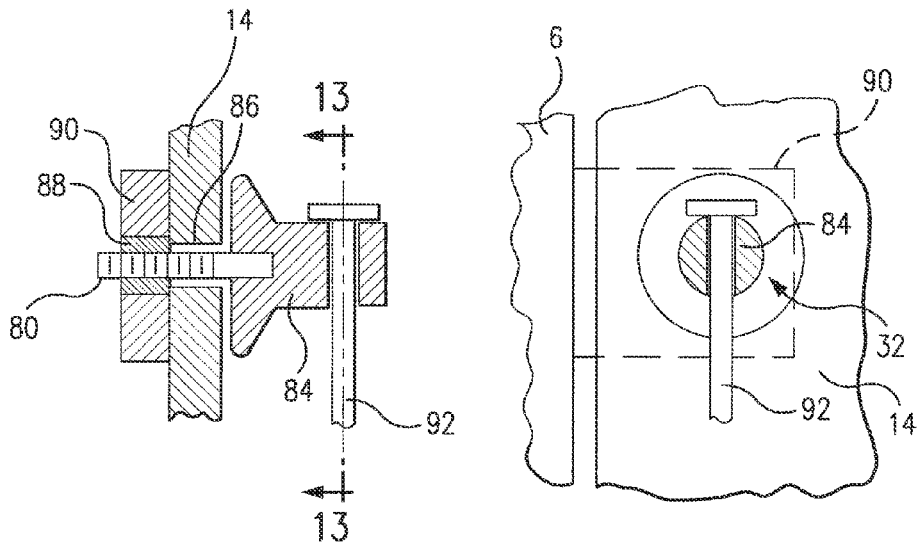
FIG. 12
FIG. 13

CONTAINER HAVING A DOWNWARDLY PIVOTABLE RAMP WALL, AND METHOD

BACKGROUND OF THE INVENTION

1. Field of the Invention

A storage bin for bulk landscaping material includes a bin body having a bottom wall, a pair of parallel spaced side walls, and a rear end wall closing the rear end of the bin body, thereby to define a chamber that is open at its front end. A rectangular ramp wall is hingedly connected with the bottom wall at the front end of the bin body for displacement between a vertical position partially closing the bin front end, and a downwardly inclined ramp position in engagement with the ground, whereby an unloading vehicle may be driven up the ramp to engage the bulk material. A horizontal connecting bar is mounted at the front end of the storage bin, whereby the bin may be transported to a site by a tilt flat bed transporting vehicle, and deposited rear-end-first from the flat bed.

2. Description of Related Art

Storage bins for bulk materials are well known in the patented prior art. A storage container with a pair of swinging doors is shown in the Straka U.S. Pat. No. 6,910,574. Collapsible and sectional shipping and storage containers are shown by the patents to Csumrik No. U.S. Pat. No. 3,809,278 and Roberts U.S. Pat. No. 5,192,176. The provision of retractable covers for storage containers is shown by the patents to Willingham No. U.S. Pat. No. 5,125,713 and Aulick U.S. Pat. No. 7,484,789.

In the prior Hughes U.S. Pat. No. 7,819,270, a telescoping material handling bin is disclosed wherein a ramp end wall is pivoted downwardly to permit a loading/unloading vehicle to be driven up the ramp for engagement with the bulk material contained in the bin.

One problem that occurs during the use of such known material handling and storage bins is that of transporting the bin to a given landscaping site, and removing the bin from the transporting vehicle without the bulk material shifting within the container to block the access doors, and/or to be discharged from an opening in a container wall.

The present invention was developed to avoid the above and other drawbacks of the known storage bins.

SUMMARY OF THE INVENTION

Accordingly, a primary object of the present invention is to provide a landscaping storage bin including a bin body having a horizontal bottom wall, a pair of parallel spaced vertical side walls, and a vertical rear end wall arranged transversely at a bin body rear end, said bottom, end and side walls cooperating to define a chamber that is open at said bin body front end, a rectangular vertical ramp wall having a horizontal lower edge hingedly connected with said bottom wall at said bin body front end for pivotal displacement about a horizontal pivot axis between a vertical first position at least partially closing said chamber front end, and a downwardly inclined second position in which the horizontal free second edge of said ramp wall engages the support surface, thereby to permit an unloading vehicle to be driven up said ramp wall for engagement with the bulk material contained within said chamber. At least one first horizontal connecting bar is mounted in parallel spaced relation on the front end of the bin body, whereby when said bin body is supported by a tilt bed vehicle with the bin body front end at the forward end of the vehicle, the bin body may be deposited by gravity rear-end-first from the tilt bed under the control of the truck connecting means.

According to another object of the invention, a pair of locking means are provided for locking the side edges of the ramp wall to the adjacent side walls, respectively, when the ramp wall is in its vertical closed position. Motor means are provided for displacing the ramp wall between it vertical first and downwardly inclined second positions.

According to another object of the invention, cover means are provided for covering the container chamber to protect the bulk material contained therein.

A further object of the invention is to provide an access door that is hingedly connected with the rear end wall to close an access opening contained therein, together with second and third horizontal cable connecting bars mounted above and below the access door, thereby to permit reloading of an empty storage bin upon a transporting vehicle. According to a more specific object, each of the horizontal connecting bars includes intermediate its ends a recess containing a hook for connection with a looped end portion of the control cable.

BRIEF DESCRIPTION OF THE DRAWINGS

Other objects and advantages of the invention will become apparent from a study of the following specification, when viewed in the light of the accompanying drawing, in which:

FIG. 9 is a sectional view illustrating the manner of connection of a cable or hook to the connection bar;

FIG. 10 is a rear perspective view of the storage bin with the cover support rods mounted in place, and FIG. 11 is a front perspective view of the covered storage bin;

FIG. 12 is a detailed sectional view of the locking means of FIG. 2, and

FIG. 13 is a sectional view taken along line 13-13 of FIG. 12.

DETAILED DESCRIPTION OF THE INVENTION

Figure 1:
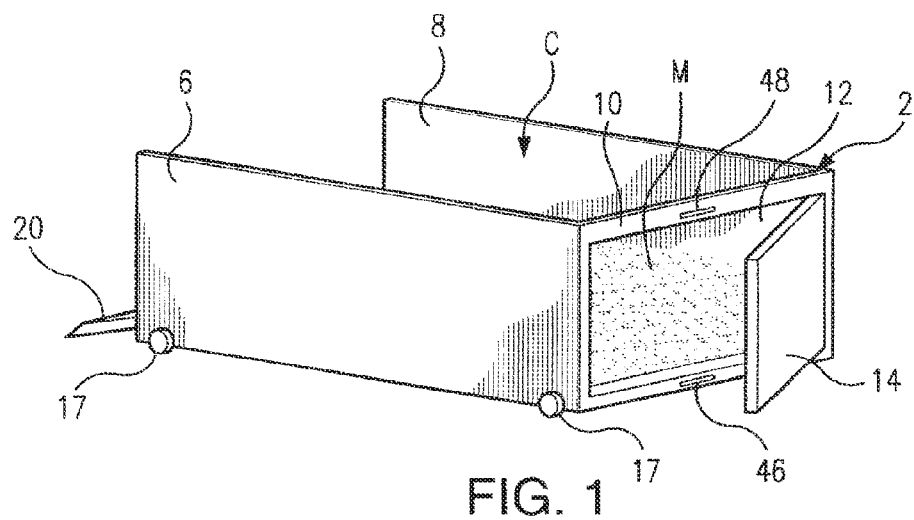
FIG. 1 is rear perspective view of the landscaping storage bin of the present invention.
Figure 2:
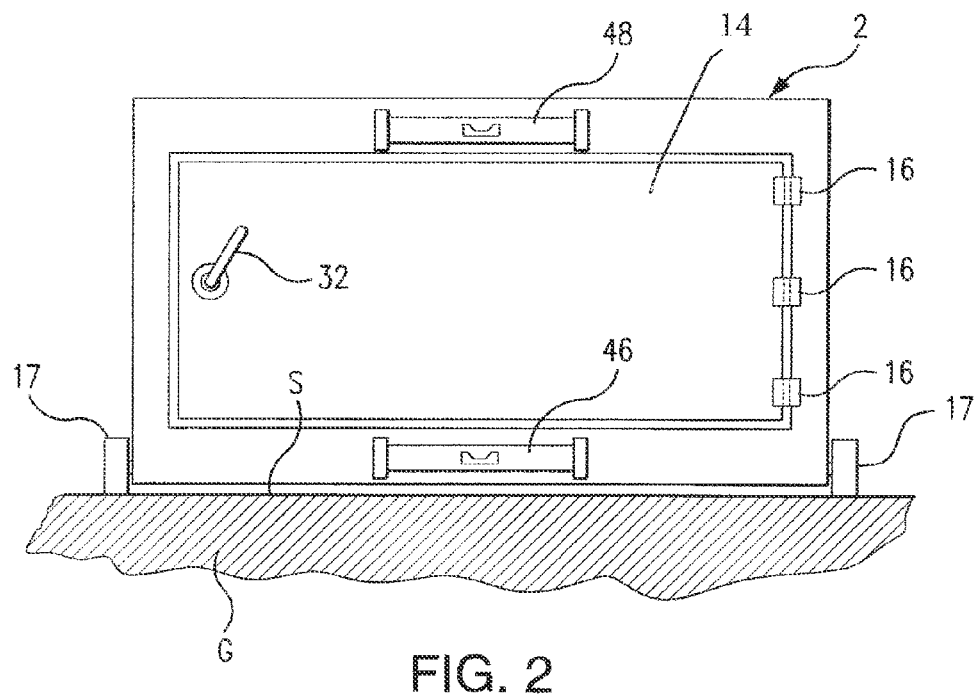
FIGS. 2 and 3 are rear and front elevation views, respectively, of the storage bin of FIG. 1.
Figure 3:
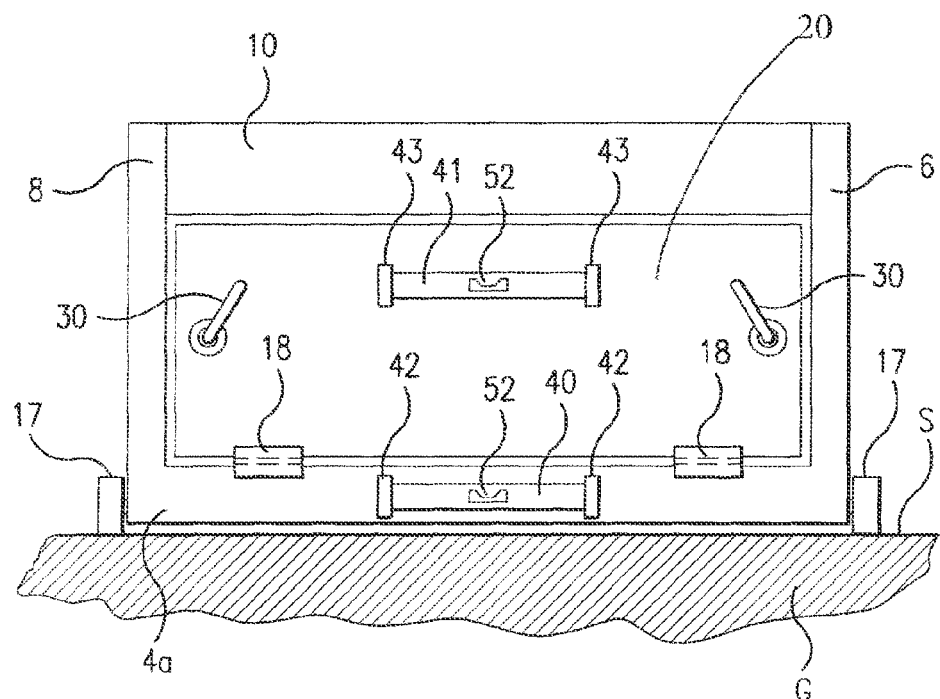

Referring first more particularly to FIGS. 1-4, the storage bin 2 of the present invention includes a horizontal bottom wall 4, a pair of vertical parallel spaced side walls 6 and 8, and a rear end wall 10 containing an access opening 12. A rectangular access door 14 has a first vertical edge portion that is pivotally connected with the rear end wall 10 by first hinge means 16 for displacement between closed (FIG. 2) and open (FIG. 1) positions relative to the opening 12. The bottom, end and side walls cooperate to define a chamber C that is open at its forward end. A plurality of rollers 17 are provided for supporting the storage bin above the ground support surface S.

Pivotally connected with the forward end of the bottom wall by hinge means 18 is a rectangular ramp wall 20 that is pivotally connected for pivotal movement between a vertical position (FIG. 3) partially closing the front end of the chamber C, and a downwardly inclined loading ramp position (FIG. 4) in engagement at its free end with the surface S of ground G. The ramp wall 20 is displaced between its vertical closed and downwardly inclined ramp position by motor means including a pair of piston and cylinder motors 22 connected between the two side walls and the ramp wall, hydraulic pump means 24, and reversing control valve means 26.

A pair of first locking means 30 (FIG. 3) are provided for locking the side edge portions of the ramp wall with the bin side walls when the ramp wall is in its vertical closed position. Second locking means 32 (FIG. 2) are provided for locking the free vertical edge portion of the access door 14 to the associated side wall.

In accordance with a characterizing feature of the invention, at least one first connecting bar 40, 41 is mounted by fixed brackets 42, 43 in horizontal parallel spaced relation on the central portion of the vertical front surface of the bin body. In one embodiment, the connecting bar 40 is connected with the front surface 4a of the bottom wall 4. In a second embodiment, the connecting bar 41 is connected with the central portion of the ramp wall 20. In a third embodiment, both connecting bars 40 and 41 are provided at the front end of the storage bin 2. Similarly, at the rear end of the storage bin body, second and third horizontal cable connecting bars 46 and 48 are mounted in spaced relation on the rear wall 10 below and above the wall opening 12.

Figure 5:
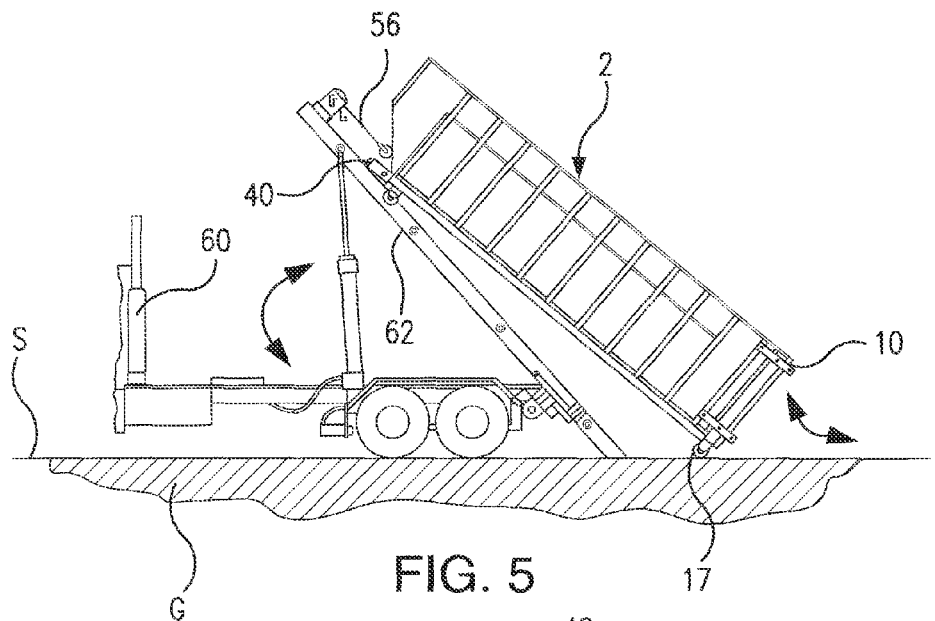
FIG. 5 is a detailed view illustrating the manner of depositing the storage bin rear-end-first from the transport vehicle.
Figure 6:
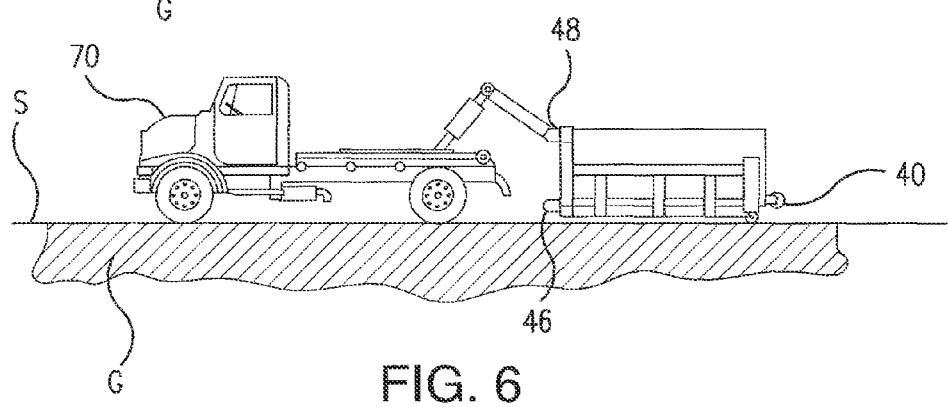
FIG. 6 illustrates the manner of connection of the transport vehicle to the rear end of the storage bin.
Figure 7:
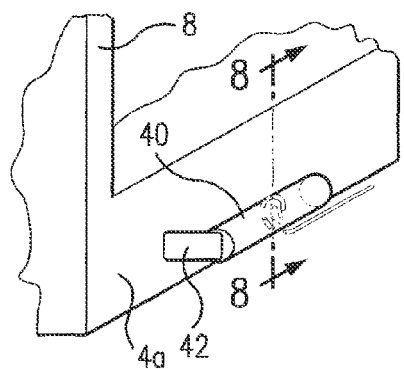
FIG. 7 is a detailed perspective view of one of the cable connection bars.
Figure 8:
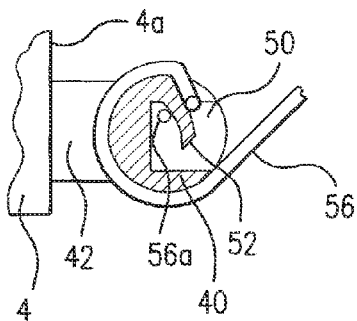
FIG. 8 is a sectional view taken along the line 8-8 of FIG. 7.

As shown in FIG. 8, each connecting bar includes intermediate its ends a recess 50 containing an integral hook 52 for connection with the looped portion 56a at the end of the control cable 56 of a tilt flat bed vehicle 60 (FIG. 5), as will be described below. In the alternate embodiment shown in FIG. 9, the connecting bar 40 is engaged by a U-shaped hook member 60 fastened to the end of the control cable 56.

When bulk landscaping material M (FIG. 4), such as mulch, pebbles, stone, or the like, is inserted into the chamber C, the storage bin 2 is transported longitudinally to the landscaping site by means of a tilt flatbed vehicle 60, with the front end of the storage bin being arranged adjacent the forward end of the horizontal flatbed 62. At this time, the control cable 56 of the flatbed is connected with the first connecting bar 40 or 41 at the forward end of the storage bin. When the flatbed 62 is tilted upwardly to the position shown in FIG. 5, the storage bin is deposited downwardly toward the surface S of the ground G as controlled by the cable 56. When the storage bin is completely seated on the ground surface, the control cable end is disconnected from the connecting bar 40 or 41, and the vehicle 60 is driven from the site.

Figure 4:
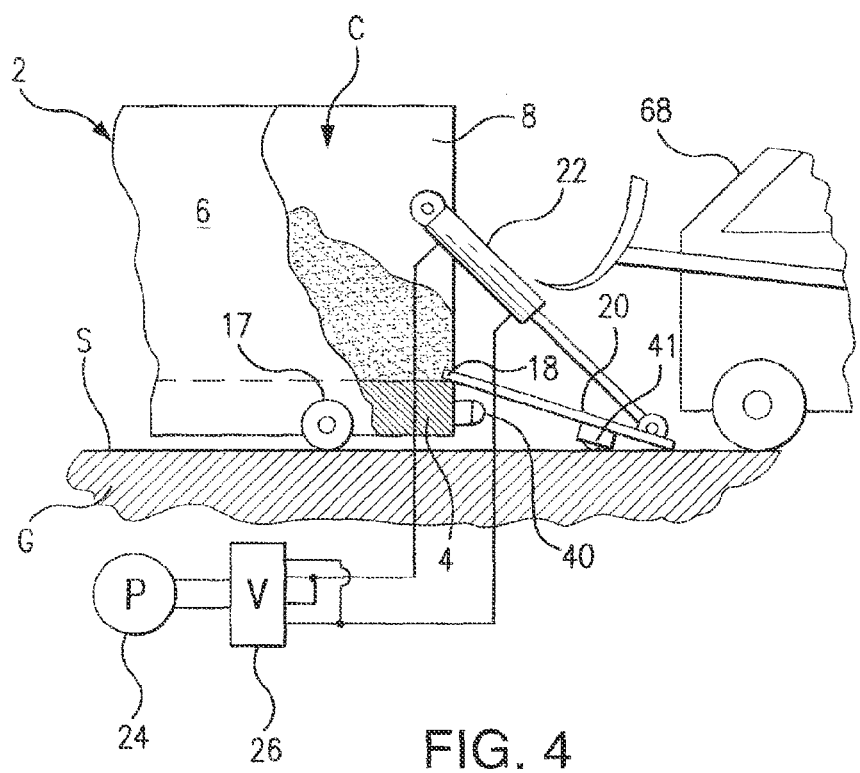
FIG. 4 is a detailed side elevation view of the front portion of the storage bin with the ramp wall in its lowered position.

In order to discharge the landscaping material M from the storage bin, the motor means 22 is operated to lower ramp wall 20 to the downwardly inclined ramp loading position shown in FIG. 4, whereupon a front end loader vehicle 68 is driven up the ramp, thereby to proceed with the unloading of the material. When the discharge of the material has been completed, the control cable of a transport vehicle 70 may be connected to either of the lower or upper connecting bars 46 or 48 at the rear end of storage, or with one of the connecting bars 40, 41 at the front of the storage bin, thereby to transport the storage bin, or to load the storage bin on the flatbed of a vehicle.

According to another feature of the invention shown in FIGS. 10 and 11, cover means 70 may be provided for covering the chamber C to protect the bulk landscaping material from the elements. These cover means include a plurality of flexible support bows 72 that are connected with the storage bin side walls by connectors 74 for supporting a flexible waterproof cover 76 that is stored in a storage receptacle 78 mounted on the storage bin side walls.

Referring now to FIGS. 12 and 13, the locking means 32 includes a locking rod 84 that is welded at one end to a locking bolt 80 that extends through opening 86 contained in the rear access door 14 for threaded engagement with a threaded bushing 88 fastened in a locking arm 90 that is secured to the adjacent storage bin side wall. An operating lever 92 is used to rotate the rod 84 to cause the bolt 80 and threaded bushing means 88 to lock the access door 14 to the associated storage bin side wall. In a similar manner, the locking means 30 of FIG. 3 serve to lock the vertical side edges of the ramp wall 20 to the storage bin side walls, respectively.

The typical dimensions of a storage bin are about 20 feet in length, 8 feet in width, and 4 ½ feet in height. Of course, these dimensions may vary considerably, as desired. The storage bin is of rigid, unitary, durable welded-beam construction.

While in accordance with the provisions of the Patent Statutes the preferred forms and embodiments of the invention have been illustrated and described, it will be apparent to those skilled in the art that changes may be made without deviating from the invention described above.

What is claimed is:

1. A landscaping storage bin for transporting and storing bulk material at a site on a ground surface (S), comprising:
   (a) a rectangular storage bin body (2) containing a chamber (C) having bottom (4), side (6, 8) and rear end (10) walls, said chamber being open at its front end, said rear end wall containing an access opening (12);
   (b) roller means (17) for supporting said bin body with said chamber bottom wall arranged at a given distance above the ground surface;
   (c) a rectangular vertical ramp wall (20) having a horizontal lower edge connected with said bottom wall at said bin body front end for pivotal displacement about a horizontal pivot axis (18) arranged at said given height above the ground surface, said ramp wall being pivotally displaceable between:
       (1) a vertical first position at least partially closing said chamber front end, and
       (2) a downwardly inclined second position in which the horizontal free second edge of said ramp wall engages the ground surface,
       (3) the width of said ramp wall and the spacing distance between said side walls being such that when said ramp wall is in said downwardly inclined second position, an unloading vehicle may be driven up said ramp wall for engagement with the bulk material contained within said chamber, and down said ramp wall to remove the bulk material from said chamber;
   (d) motor means (22) for displacing said ramp wall between said vertical first position and said downwardly inclined second position;
   (e) a first connecting member (40) mounted on said storage bin body front end, whereby when said bin body is arranged on a tilt bed vehicle with the bin body front end adjacent the forward end of the vehicle, the bin body may be deposited by gravity rear-end-first from the tilt bed under the control of a flexible control member (56) connected with said first connecting member;
   (f) first locking means (30) operable when said ramp wall is in said vertical position for locking the vertical end portions of said ramp wall to the associated bin body side walls, respectively;
   (g) a vertical rectangular access door (14) having a first vertical edge portion hingedly connected with said rear wall access opening, thereby to afford pivotal movement of said access door between closed and open positions about a vertical axis relative to said access opening; and (h) second locking means (32) for locking the other vertical edge of said access door with said rear end wall when said access door is in said closed position.

2. A landscaping storage bin as defined in claim 1, and further including:
   (i) cover means (76) removably connected with said bin body side walls for covering the top of said chamber.

3. A landscaping storage bin as defined in claim 1, and further including:
   (i) second (46) and third (48) connecting members connected with the external surface of said rear end wall below and above said access opening, respectively, thereby to permit the loading by the control cable of the bin body rear end on the tilt bed adjacent the forward end of the tilt bed vehicle.

4. A landscaping storage bin as defined in claim 3, wherein each of said connecting members comprises a horizontal connecting bar containing a recess including an integral hook, said hook being arranged for locking engagement by a loop end portion at the end of the flexible control member.

5. A method for transporting bulk landscaping material to, and storing and dispensing said material at, a given site to be landscaped, comprising:
   (a) providing a rectangular storage bin having a horizontal bottom wall, a pair of parallel spaced vertical side walls, and a vertical rear end wall cooperating with said bottom and side walls at the rear end of said transport vehicle to define a chamber (C) that has a bottom wall and is open at its forward end, and a vertical rectangular ramp wall at least partially closing the chamber forward end, said ramp wall having a horizontal lower edge that is hingedly connected with said bottom wall for pivotal movement about a horizontal pivot axis arranged adjacent said chamber bottom wall;
   (b) loading at a loading station a quantity of bulk landscaping material in said chamber;
   (c) positioning said loaded storage bin on the horizontal tilt flat bed of a vehicle and transporting said vehicle to a desired landscaping site;
   (d) tilting said flat bed relative to said chassis, thereby to deposit said storage bin on the site ground surface (S) with said horizontal pivot axis and the bottom chamber surface arranged at a given height above the ground surface;
   (e) pivoting said ramp wall downwardly about said horizontal pivot axis toward a downwardly-inclined position in engagement at its free lower edge with the ground surface; and
   (f) driving a front-end-loading vehicle up the ramp wall and into the chamber for engagement with the bulk material that is to be removed from said chamber.

* * * * *